US008667032B1

(12) United States Patent
Shilane et al.

(10) Patent No.: US 8,667,032 B1
(45) Date of Patent: Mar. 4, 2014

(54) EFFICIENT CONTENT META-DATA COLLECTION AND TRACE GENERATION FROM DEDUPLICATED STORAGE (75) Inventors: Philip Shilane, Yardley, PA (US); Grant Wallace, Pennington, NJ (US); Frederick Douglis, Basking Ridge, NJ (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 13/335,750

(22) Filed: Dec. 22, 2011

(51) Int. Cl.
G06F 7/00 (2006.01)
G06F 17/30 (2006.01)

(52) U.S. Cl.
CPC .............................. *G06F 17/30156* (2013.01)
USPC ........................................................ 707/825

(58) Field of Classification Search
None
See application file for complete search history.

(56) References Cited

U.S. PATENT DOCUMENTS

| 7,443,321 | B1 | 10/2008 | Kaufman et al. |
| 7,610,283 | B2 | 10/2009 | Arasu et al. |
| 7,689,764 | B1* | 3/2010 | De Spiegeleer et al. ...... 711/108 |
| 7,797,279 | B1 | 9/2010 | Starling et al. |
| 7,814,078 | B1* | 10/2010 | Forman et al. ................ 707/698 |
| 7,885,988 | B2 | 2/2011 | Bashyam et al. |
| 8,060,476 | B1 | 11/2011 | Afonso et al. |
| 8,112,496 | B2 | 2/2012 | Manasse et al. |
| 8,117,173 | B2 | 2/2012 | Gurevich et al. |
| 8,255,365 | B2 | 8/2012 | Zeis et al. |
| 8,255,434 | B2 | 8/2012 | Williams |
| 8,275,756 | B2 | 9/2012 | Hirsch et al. |
| 8,290,972 | B1* | 10/2012 | Deshmukh et al. ........... 707/758 |
| 8,412,848 | B2 | 4/2013 | Therrien et al. |
| 8,417,727 | B2 | 4/2013 | Slezak et al. |
| 2004/0215501 | A1* | 10/2004 | d'Ornano ......................... 705/10 |
| 2005/0198570 | A1* | 9/2005 | Otsuka et al. .................. 715/515 |
| 2007/0124415 | A1* | 5/2007 | Lev-Ran et al. ............... 709/217 |
| 2008/0243878 | A1* | 10/2008 | de Spiegeleer et al. ........ 707/100 |
| 2008/0243953 | A1* | 10/2008 | Wu et al. ........................ 707/204 |
| 2008/0256326 | A1* | 10/2008 | Patterson et al. .............. 711/206 |
| 2008/0281908 | A1 | 11/2008 | McCanne et al. |
| 2009/0049260 | A1* | 2/2009 | Upadhyayula ................ 711/162 |
| 2010/0094817 | A1* | 4/2010 | Ben-Shaul et al. ............ 707/697 |
| 2012/0036113 | A1 | 2/2012 | Lillibridge et al. |
| 2012/0166448 | A1 | 6/2012 | Li et al. |
| 2012/0239630 | A1 | 9/2012 | Wideman et al. |

OTHER PUBLICATIONS

Dong, Wei , et al., "Tradeoffs in Scalable Data Routing for Deduplication Clusters", *Proceedings of the 9th USENIX Conference on File and Storage Technologies (FAST 2011)*, San Jose, CA, USA, 2011, 15 pagesNov. 1, 2011.

(Continued)

*Primary Examiner* — Jay Morrison
(74) *Attorney, Agent, or Firm* — Blakely, Sokoloff, Taylor & Zafman (57) ABSTRACT

The method and apparatus collect file recipes from deduplicated data storage systems, the file recipes consist of a list of fingerprints of data chunks of a file. Detailed meta-data for each unique data chunk is also collected. In an offline process, research and analysis can be performed on either the meta-data itself or on a reconstruction of a full trace of meta-data constructed by matching recipe fingerprints to the corresponding meta-data. The method and system can generate the full meta-data trace efficiently in an on-line or off-line process. Typical deduplicated storage systems achieve 10× or higher deduplication rates, and the meta-data collection is faster than processing all of the original files and produces compact meta-data that is smaller to store.

17 Claims, 10 Drawing Sheets (56) References Cited

OTHER PUBLICATIONS

Zhu, Benjamin, et al., "Avoiding the Disk Bottleneck in the Data Domain Deduplicaiotn File Systems", *Proceedings of the 6th USENIX Conference on File and Storage Technologies (Fast '08)*, San Jose, CA, USA, 2008, 14 pages.

Non-Final Office Action, U.S. Appl. No. 13/335,746, dated Mar. 1, 2013, 14 pages.
Non-Final Office Action, U.S. Appl. No. 13/335,416, dated Jan. 11, 2013, 16 pages.
Final Office Action, U.S. Appl. No. 13/335,416, dated Jun. 24, 2013, 22 pages.

\* cited by examiner

EFFICIENT CONTENT META-DATA COLLECTION AND TRACE GENERATION FROM DEDUPLICATED STORAGE

CROSS REFERENCE TO RELATED APPLICATION

This application is related to co-pending patent application entitled "Efficient Content Meta-Data Collection and Trace Generation from Deduplicated Storage," Ser. No. 13/335,746, filed on the same date as the present application and commonly owned. The cross-referenced application is incorporated herein by reference.

FIELD OF THE INVENTION

Embodiments of the present invention relate generally to data storage systems. More particularly, embodiments of the invention relate to collecting meta-data and generating meta-data traces.

BACKGROUND

Many companies and individuals with large amounts of stored data employ a backup data storage system. These backup data storage systems can be located local to the data to be backed up or at a remote site. The backup data storage systems can be managed by the entity controlling the primary data storage devices or a backup data storage service company. Data can be backed up at any frequency and any amount of data can be backed up. The backed up data can be retrieved in the case of a failure of a primary storage device from the backup data storage system. Where the backup is managed by a service company the data of many separate clients of the backup service can be backed up into the backup data storage system.

Deduplicating data before storage is widespread within the backup storage service market and is of growing interest in other data storage markets as well. The basic idea is to divide incoming data into smaller units called data chunks, generate a secure hash such as a secure hash algorithm 1 (SHA1) over the data chunk (this hash result is referred to herein as a "fingerprint"), and check the fingerprint against an index of previously stored data chunks. Fingerprints already stored are considered duplicates, while fingerprints that are not indexed cause the corresponding data chunk to be stored and the fingerprint added to the index. In this way only unique data chunks need to be stored. A file has a recipe for reconstruction, which consists of a list of fingerprints and related information corresponding to unique data chunks stored in the backup data storage system. For backup data storage systems, the typical backup cycle consists of daily or weekly full backups of a primary data storage system, so most of the data stored in the backup data storage system is repeated or a 'duplicate.' This typically leads to high deduplication rates of 10 times (i.e., 10×) or more.

It has been common to collect traces that consist of disk block ID or other input/output (I/O) level access patterns for data storage pattern analysis and similar analysis. Collecting I/O trace data is of growing importance especially for deduplicated storage systems. However, I/O level traces provide limited insight into the actual data content in the backup data storage systems. An alternative has been to fabricate data content for data storage analysis. However, by its nature the fabricated content is not sufficiently representative of actual data content in the backup data storage systems. The limitations of these two data sets affect the quality of research into improving data storage and backup data storage systems.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present invention.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In one embodiment, a backup data storage system is a deduplicated storage system having a set of storage units. A 'set,' as used herein refers to any positive whole number of items including one item. Each of the storage units is configured to store data chunks that are deduplicated within each of the data storage units, where the files stored in the storage system are comprised of the data chunks. Each data chunk is formed through a specific policy, e.g. by breaking a file based on properties of the content in the file, which permits changes to one data chunk without affecting the boundaries or contents of other chunks. Each data chunk is associated with a fingerprint and similar meta-data (e.g., meta-data) representing the data chunk. A fingerprint contains a meta-data value (e.g., a hash value) that uniquely identifies that data object. Fingerprints can be used to identify duplicate data chunks. As used herein, this meta-data is in contrast with the 'content' of the data in the files.

Analyzing data in storage systems is useful for numerous purposes including: debugging customer problems, optimizing storage configuration parameters, and exploring alternative storage architectures. While it has been common to collect storage traces that consist of disk block or other I/O level access patterns, collecting data itself is of growing importance especially for deduplicated storage systems. Customers may face problems with their deduplicated storage related to data compression or slow throughput that are related to the data itself and cannot be solved with I/O level information. Collecting full data traces would be useful, but it is impractical because of user privacy concerns, time to collect the full datasets, and the large storage requirements. This is particularly an issue with large data sets, such as data sets that exceed five terabytes. The collection technique described herein below addresses these concerns. The process and system described herein below presents a technique for reconstructing a full trace in a memory efficient manner using file recipes and data chunk meta-data. The process and system are effective in collecting data even in systems where the data exceed five terabytes.

The system and process described herein for collecting content meta-data is time efficient during the collection stage and space efficient for long term storage as well as capable of regenerating a full trace from the collection. On deduplicated storage systems, redundant data may be partitioned and referenced many times as chunks, and detailed information about the chunks only needs to be collected and stored once. The process and system collect file recipes, which consist of a list of fingerprints for chunks of a file, as well as detailed meta-data for the unique instance of each chunk. In an offline process, the process and system can perform analysis on either the meta-data of the unique data chunk instances themselves or reconstruct a full trace of meta-data of chunks comprising a file by matching recipe fingerprints to the corresponding meta-data. The process and system generate the full trace using an efficient on-line or off-line technique. Typical deduplicated storage systems achieve 10× or higher deduplication rates, and the collection process and structure described herein is faster than processing all of the original files and produces compact meta-data that is smaller to store.

Figure 1:
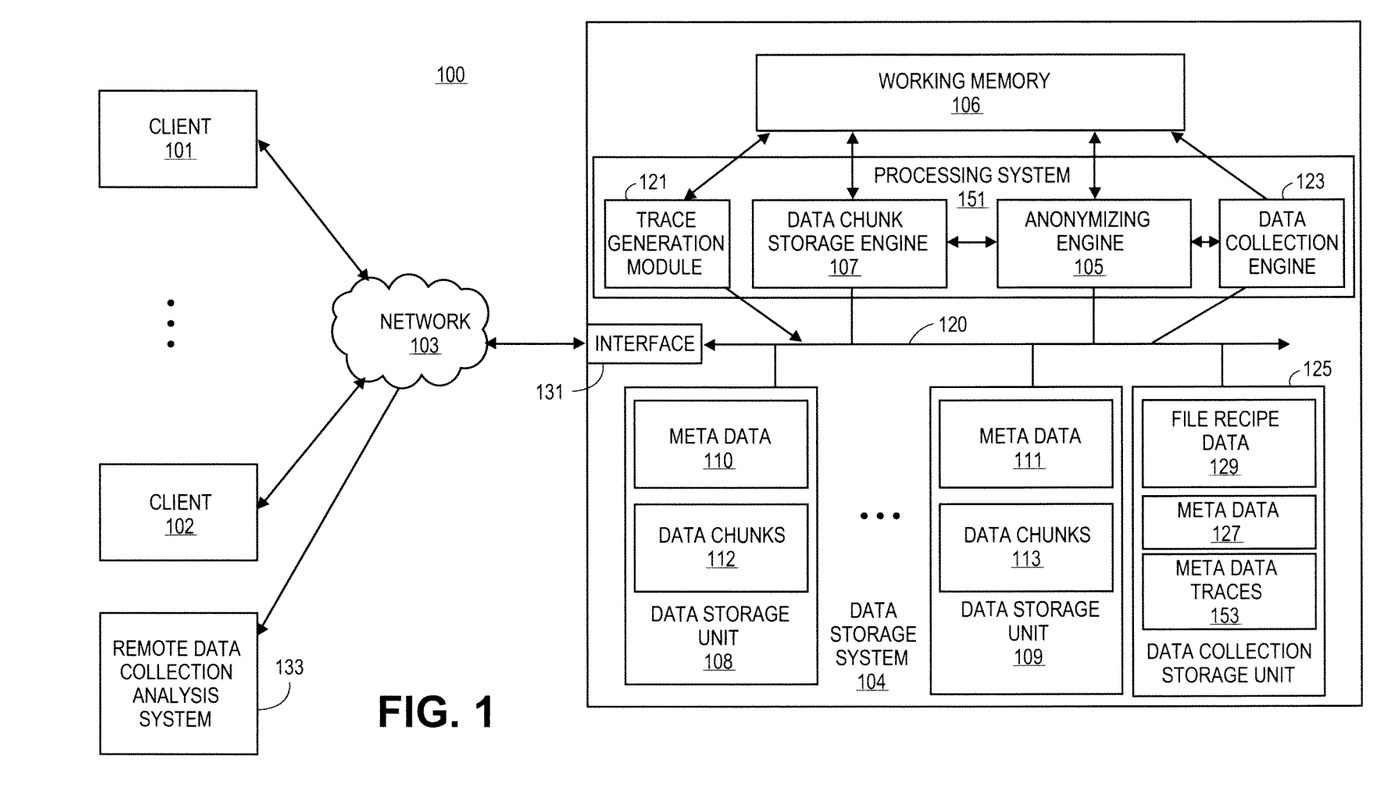
FIG. 1 is a block diagram of one embodiment of a backup data storage system.

FIG. 1 is a diagram of one embodiment of a data storage system and a network of associated machines. Referring to FIG. 1, the system 100 includes, but is not limited to, one or more client systems 101, 102 and a remote data collection analysis system 133 communicatively coupled to data storage system 104 over network 103. Clients 101, 102 can be any type of computing devices such as a server, a personal computer (e.g., desktops, laptops, and tablets), a "thin" client, a personal digital assistant (PDA), a Web enabled appliance, a gaming device, a media player, or a mobile phone (e.g., Smartphone), or similar computing device. Network 103 can be any type of network such as a local area network (LAN), a wide area network (WAN) such as the Internet, a corporate intranet, a metropolitan area network (MAN), a storage area network (SAN), a bus, or a combination thereof, where constituent devices within the networks communicate over any combination of wired and/or wireless transport mediums. The clients 101, 102 transmit data to the data storage system 104 over the network 103 for storage at the data storage system 104.

Data storage system 104 can include any type of server or cluster of servers. For example, data storage system 104 can be a storage server used for any of various different purposes, such as to provide multiple users with access to shared data and/or to back up mission critical data. Data storage system 104 can be, for example, a file server (e.g., an appliance used to provide network attached storage (NAS) capability), a block-based data storage server (e.g., used to provide storage area network (SAN) capability), a unified data storage device (e.g., one which combines NAS and SAN capabilities), a nearline data storage device, a direct attached storage (DAS) device, a tape backup device, or any other type of data storage device. Data storage system 104 can have a distributed architecture, or all of its components can be integrated into a single unit. Data storage system 104 can be implemented as part of an archive and/or backup system such as a deduplication storage system available from EMC® Corporation of Hopkinton, Mass.

In one embodiment, data storage system 104 includes, but is not limited to a set of data storage units 108, 109, data collection storage unit 125, processing system 151, working memory 106, interconnect 120, interface 131 and similar components. The processing system 151 can include a set of processing devices for processing and managing data within the data storage system 104. The working memory 106 is used by the processing system 151 to manipulate data and execute instructions. In one embodiment, the processing system 151 executes instructions to implement the trace generation module 121, data chunk storage engine 107, anonymizing engine 105, data collection engine 123 and similar components and uses the working memory 106 in this process.

The data chunk storage engine 107, trace generation module 121, anonymizing engine 105, data collection engine 123, data storage units 108, 109, data collection storage unit 125, and similar components which are communicatively coupled to one another and the processing system 151 and working memory 106. Data storage units 108, 109 can be implemented locally (e.g., single node operating environment) or remotely (e.g., multi-node operating environment) via interconnect 120, which may be a bus or a network.

In one embodiment, one of the data storage units 108, 109 operates as an active storage to receive and store external or recently received user data, while the other data storage unit operates as a secondary data storage unit to periodically archive data from the active storage unit according to an archiving policy or scheme. Data storage units 108, 109 can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Data storage units 108, 109 can also be combinations of such devices. In the case of disk storage media, the data storage units 108, 109 can be organized into one or more volumes of Redundant Array of Inexpensive Disks (RAIDs).

In response to a data file being received to be stored in data storage units 108, 109, data chunk storage engine 107 is configured to divide the data file into multiple data chunks according to a variety of data division policies or rules. In one embodiment, data chunk storage engine 107 only stores a chunk in a data storage unit if the data chunk has not been previously stored in the storage unit. In the event that a data chunk has been previously stored, meta-data information is stored enabling the reconstruction of a file using the previously stored data chunk. As a result, chunks of data files are stored in a deduplicated manner, either within each of data storage units 108, 109 or across at least some of the data storage units 108, 109. In addition, meta-data is added to at least some of data storage units 108, 109, such that files can be accessed independent of another storage unit. Data stored in the data storage units can be stored in a compressed form (e.g., lossless compression: Huffman coding, Lempel-Ziv Welch coding; delta encoding, i.e., a reference to a data chunk plus a difference (a 'delta')). In one embodiment, different data storage units can use different compressions (e.g., main or active data storage unit 108 using a different compression from other data storage units, one storage unit from another storage unit, or similar variations). Also, different chunks can use different compressions in any combination or configuration.

In a further embodiment, the data chunks can be further sub-divided into sub-chunks. Sub-chunk deduplication can then be employed to further reduce duplication by requiring smaller units of duplicate data for a match to be identified. The principles and features described herein in relation to chunks would be understood by one skilled in the art to be generally applicable to sub-chunks as well.

Meta-data of each data storage unit includes enough information to provide access to the files it contains. When an active data storage unit fails, meta-data contained in another data storage unit can be utilized to recover the files of active data storage unit. When one data storage unit is unavailable (e.g., the storage unit has failed, or is being upgraded, etc.), the data storage system 104 remains up to provide access to any file not stored in the failed storage unit. When a tile is deleted, the meta-data associated with the files in the data storage system 104 is updated to reflect that the file has been deleted.

In one embodiment, the meta-data information includes a file name, a storage unit where the data chunks associated with the file name are stored, reconstruction information for the file using the data chunks, data chunk type, local compression size, sub-chunk sizes, fingerprint, data chunk hashes, data chunk resemblance hashes for delta encoding, disk location, and any other appropriate meta-data information. In one embodiment, a copy of the meta-data is stored on a storage unit for files stored on a storage unit so that files that are stored on the storage unit can be accessed using only the meta-data stored on the data storage unit. In one embodiment, a main set of meta-data information can be reconstructed by using information of other data storage units associated with the storage system in the event that the main meta-data is lost, corrupted, damaged, or similarly unavailable. Meta-data for a data storage unit can be reconstructed using meta-data information stored on an active data storage unit or other storage unit (e.g., replica storage unit). Meta-data information further includes index information (e.g., location information for chunks in storage units).

In one embodiment, data storage systems as shown in FIG. 1 can be used as a tier of storage in a storage hierarchy that comprises other tiers of storage. One or more tiers of storage in this hierarchy can utilize different kinds of storage devices and/or can be optimized for different characteristics such as random update performance. Files are periodically moved among the tiers based on data management policies to achieve a cost-effective match to the current storage requirements of the files. For example, a file can initially be stored in a tier of storage that offers high performance for reads and writes. As the file ages, it may be moved into a tier of storage according to this invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Meta-data 110, 111 can include a fingerprint of a data chunk. In one embodiment, a fingerprint may include a hash value computed based on the data chunk using a variety of hash algorithms, such as SHA-1 or message digest 5 (MD5) hash algorithms. Alternatively, meta-data can include one or more features extracted from the corresponding data chunk using a variety of feature extraction methods. Feature extraction involves simplifying the amount of resources required to describe a large set of data accurately. Feature extraction is a general term for methods of constructing combinations of the variables to get around these problems while still describing the data with sufficient accuracy. Furthermore, meta-data can include a combination of a fingerprint and one or more features extracted from a corresponding data chunk.

Note that throughout this application, a deduplicated storage system is utilized as an example of a data storage system. However, the techniques described throughout this application can also be applied to other types of non-duplicated storage system. Also note that a fingerprint is utilized as an example of meta-data, however, other types of data such as a feature, signature, or pattern of data can also be applied. If data are transformed by filtering portions of content, the transformed data and meta-data therein will be distinct from the fingerprint used for deduplication and will be computed and stored separately.

In one embodiment, the system 100 includes a remote data collection analysis system 133. The remote data collection analysis system 133 can access meta-data 127 and meta-data traces 153 stored by the data collection system 125. The remote data collections analysis system 133 can communicate with the data storage system 104 through the interface 131 to obtain the meta-data 127 or meta-data traces 153. The retrieved data can then be analyzed or researched to improve data storage processes and systems. The remote data collection analysis system 133 can also be local to or integrated with the data storage system 104.

A data collection storage unit 125 can store file recipe data 129, meta-data 127 and meta-data traces 153. This data is collected and retained for research and analysis of data storage processes and structures. The data collection storage unit 125 can be accessed by local components over the interconnect 120. The data collection storage unit 125 can be accessed through the interface 131 by the remote data collection analysis system 133. The data collection engine 123 processes either data storage unit 108, 109 to obtain the meta-data to be further processed by the remote data collection analysis system 133 or similar components. The trace generation module 121 retrieves file recipe data 129 from the data collection unit 125 and generates the meta-data trace 153. Similarly, the data collection engine 123 can store the data collected and generated in a manner that facilitates retrieval and further processing. In one embodiment, meta-data 127 has been accumulated from the meta-data (110 and 111) of data storage system 104. In another embodiment, the remote data collection analysis system 133 generates the meta-data traces 153 from the accumulated meta-data 127.

The anonymizing engine 105 can work in conjunction with the data collection engine 123 as discussed herein below. The anonymizing engine 105 performs a hash, encryption or similar transformation algorithm on a data set such as meta-data 127 and file recipe data 129 in the data collection storage 125 to avoid the disclosure of sensitive client information. Even if the meta-data 127 and file recipe data 129 do not contain client system data, the information about the client system files provided by the meta-data 127 and file recipe data 129 could be used to determine the existence of particular files in a client system or to determine configuration information about the client system that could expose the client data to attack. This process is described further herein below.

Figure 2:
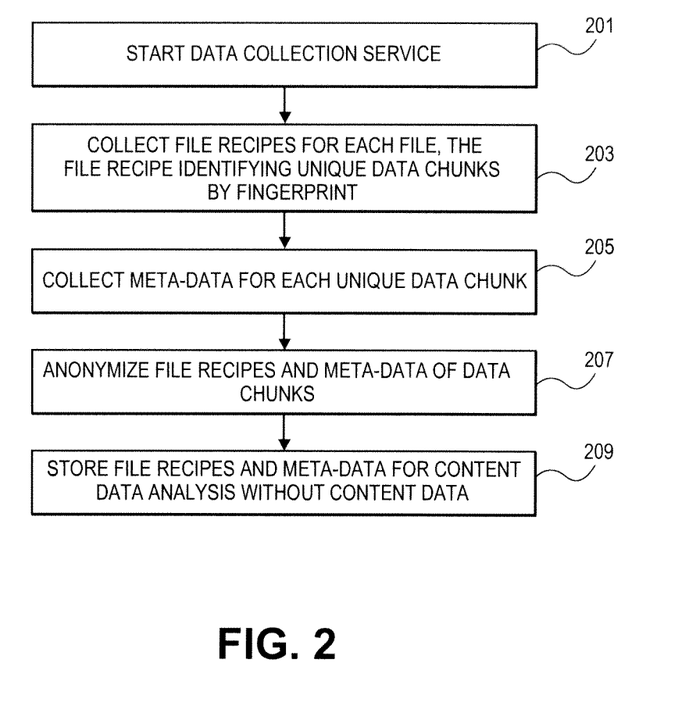
FIG. 2 is a flowchart of one embodiment of a meta-data collection process.

FIG. 2 is a flowchart of one embodiment of a meta-data collection process. The meta-data collection process can be implemented by the data collection engine in combination with the processing system of the data storage system. The data collection engine accesses the data storage units of the data storage system to collect meta-data about the stored files for use in research and analysis of data storage systems.

The process can be initiated at any time as an on-line or off-line or out-of core process (Block 201). An on-line process as used herein refers to a process that is part of the data storage process where the data is received from client systems and stored in the data storage system, but that is run concurrently with the data storage process. In one embodiment, the on-line process utilizes a snapshot of the data (or a subset of the data) stored in the data storage system to provide a consistent view of the data storage system during the meta-data collection process and trace generation process. A snapshot is a representation of the data stored in the data storage system at a given point in time. Using a snapshot or similar technique allows the meta-data collection and trace generation processes to proceed despite ongoing writes, deletions and similar modifications to the data in the data storage system. In a further embodiment, the meta-data collection process and trace generation process can proceed without the use of a snapshot or similar technique for providing a consistent view of the data in the data storage system. In this case, the meta-data collection and the trace generation are tolerant of the inconsistencies and the subsequent data analysis is also tolerant of the inconsistencies.

An off-line process refers to a separate process that runs when the data storage system is made unavailable to a client system, thus data storage access by client systems would not occur while an off-line collection process is running.

The process can collect file recipes for each file in a data storage unit (Block 203). The file recipes can be obtained by performing queries to the data storage unit or by traversing the data storage unit to obtain all of the file recipes. In this embodiment, the data is stored in the data storage units in a deduplicated format and the file recipes are stored as a set of data referred to herein as file meta-data in contrast with meta-data of a data chunk within the data storage units. The file recipes include a list of data chunks that comprise the associated file, where the data chunks are identified by a fingerprint of the data chunk. Only unique data chunks need to be stored in the data chunks section of the data storage units.

After each of the file recipes or a set of the available file recipes is retrieved from the data storage units, the meta-data for each unique data chunk is retrieved (Block 205). In this deduplicated storage embodiment, the meta-data has already been collected and stored in the data storage unit and needs primarily to be retrieved. Any amount of derived or generated meta-data can also be generated based on information from the retrieved meta-data, the data chunks, or other data sources.

The retrieved unique data chunk meta-data and file recipes can then be anonymized (Block 207). The data collection module can work in conjunction with the anonymizing engine to encode or encipher the meta-data associated with each data chunk. The anonymization of the meta-data must maintain the link between the representation of the fingerprint identified in the file recipes for data chunks and the fingerprint of the data chunks associated with the unique data chunk meta data. Thus, any transformation of the fingerprint data must have a 1:1 correspondence. Algorithms that can be utilized to anonymize the unique data chunk and file recipes include SHA-1 and other forms of encryption, as well as simpler but more efficient means of obfuscating fingerprints, such as XORing a value into each one. In one embodiment, XOR is applied to fingerprints and SHA-1 hash file names.

After the file recipes and the meta-data of the unique data chunks has completed, this collected data can be stored in a data collection storage unit (Block 209). The file recipe data is stored separate from the meta-data of the unique data chunks. This maintains the non-duplicative nature of the data organization of the data storage system. The file recipe data and the meta-data of the files in the data storage units can then be more easily accessed for research and analysis related to data storage systems. The file recipe data and data chunk meta-data provides significant detail regarding the original data content being backed up or similarly stored that better approximates the real world data storage unit scenario than the standard I/O traces that previously had been used.

Figure 3:
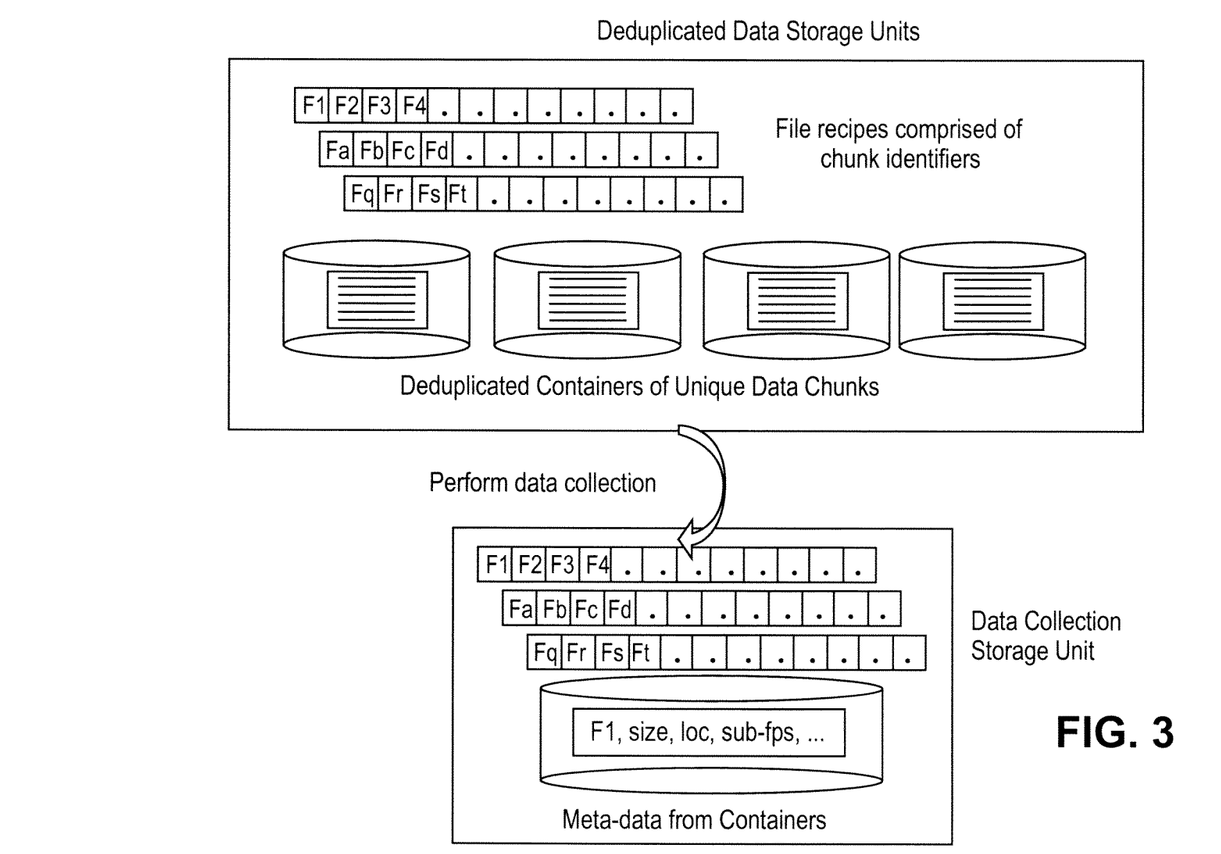
FIG. 3 is a diagram of one embodiment of the meta-data collection process.

FIG. 3 is a diagram of one embodiment of the meta-data collection process. The diagram shows the deduplicated data storage units containing a set of file recipes and a set of unique data chunks. The example unique data chunks in the file recipes are labeled F1-F4, Fa-Fd and Fq-Ft. Any number of file recipes can be present in the deduplicated data storage corresponding to a set of files being stored therein. The unique data chunks can be stored in any order or organization. In one example embodiment, the unique data chunks are stored in sets referred to as containers. These containers can be any size and have any organization. In one example embodiment, the containers can be sized to fit in the working memory of the data storage system. Any number of unique data chunks, containers and related data can be stored in the data storage system.

The data collections process reduces this data set to a copy of the set of file recipes and meta-data associated with each of the unique data chunks. This collected data is typically an order of magnitude smaller than the deduplicated data, which in turn is often a tenth of the data of the original data set. The collected data is stored in the data collection storage unit. The file recipes can be stored with the same organization as in the Data Storage units or can be differently organized. The meta-data collected can be stored in containers or bins that are sized to fit into the working memory. The meta-data collected, as described above, can be any set of fields or values associated with the unique data chunks stored in the data storage units.

Figure 4:
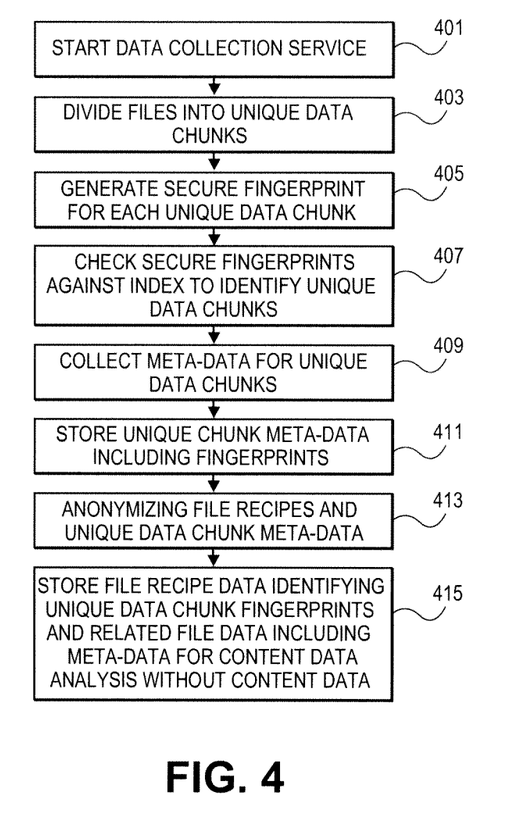
FIG. 4 is a flowchart of another embodiment of a meta-data collection process.

FIG. 4 is a flowchart of another embodiment of a meta-data collection process. This process is adapted for use in a data storage system where the data storage units are not deduplicated. In one embodiment, this process can be initiated at the time that data is received from a client or any time after the data is received by the client machine (Block 201). This process collects file recipe data and unique data chunk meta-data from non-deduplicative data sets. The data is essentially deduplicated during this process. The deduplication can be preserved and used for primary data backup and storage purposes or can be discarded after used to collect the file recipe data and unique data chunk meta-data.

Each of the files in the data storage unit or each of the files received from the client are divided into data chunks (Block 403). The data chunks can be sized based on any criteria to optimize the finding of identical data chunks that do not need to be stored. The size of the data chunks must be sufficient to justify the overhead in tracking the data chunks for each file through the use of a file recipe. For each data chunk a secure hashing algorithm such as SHA1 is run on the data chunks to create a fingerprint that is an identifier that uniquely labels the data chunks (Block 405). Other methods for generating the fingerprint can include any type of transformation algorithm, ciphering or encoding that generates a unique value given the data chunk as an input. The fingerprint can also be added to the file recipe for the associated file to represent the data chunk being processed.

The fingerprint is then checked against an index or similar database of previously identified fingerprints (Block 407). If the fingerprint is found, then the data chunks do not need to be stored and can be discarded. If the fingerprint is not found, then a new unique data chunk has been found and is stored. After the data chunk has been checked against the index, meta-data for any identified unique data chunks are collected (Block 409). The meta-data can include data chunk type, local compression size, sub-chunk sizes, fingerprint, data chunk hashes, data chunk resemblance hashes for delta encoding and disk location. The unique data chunk and meta-data are then stored in the data collection storage unit for subsequent analysis and research uses (Block 411).

The stored unique data chunk and file recipes are anonymized using a transform algorithm that can be any encoding, ciphering or similar algorithm that maintains the relationship between the fingerprint in the meta-data and the fingerprint for the same data chunk in the file recipe (Block 413). The anonymized unique data chunk and file recipes are then stored in the data collection storage unit for future use in data storage system analysis and research (Block 415).

Figure 5:
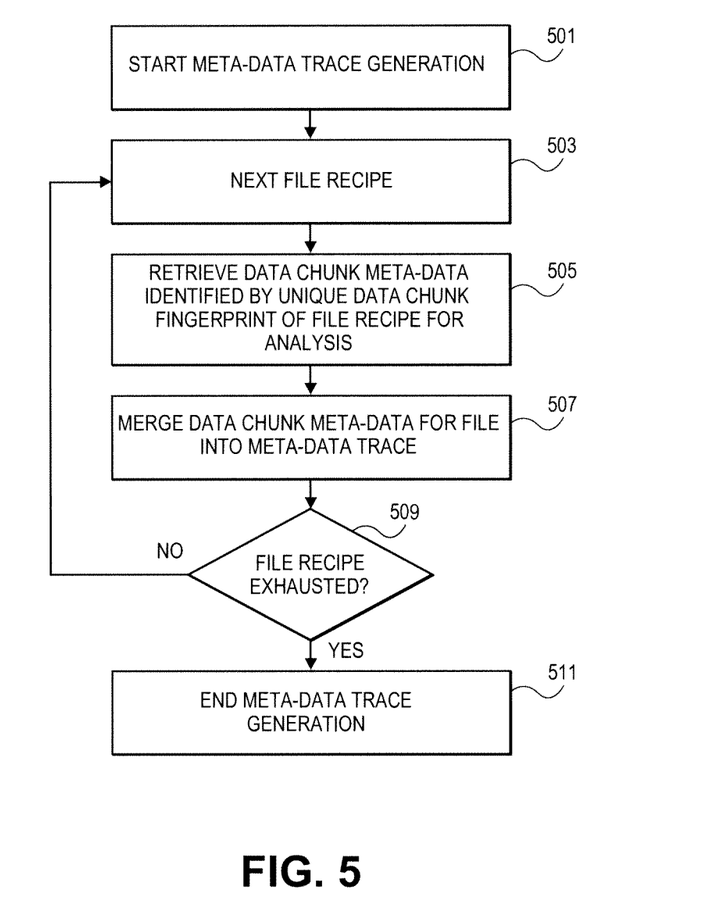
FIG. 5 is a flowchart of one embodiment of a meta-data trace generation process.

FIG. 5 is a flowchart of one embodiment of a meta-data trace generation process. In one embodiment, a meta-data trace generation can be initiated in response to a request for the meta-data trace for analysis or research by an analysis system. In other embodiments, the meta-data trace generation is executed on a periodic basis, after the meta-data collection process or at any other defined time. In one embodiment, the meta-data trace generation process sequentially selects and processes file recipes to generate meta-data traces (Block 503). In other embodiments, the file recipe processing is partially or entirely in parallel or any combination thereof.

For each selected file recipe the data chunk meta-data is retrieved for each unique data chunk identified by the file recipe for analysis (Block 505). The data chunk meta-data is retrieved from the data collection storage unit. The data chunk meta-data can be identified and retrieved by the fingerprint of the data chunk with which it is associated. The fingerprints serve as unique identifiers for each data chunk. As each data chunk meta-data is retrieved it is merged into meta-data trace structure with previously retrieved meta-data (Block 507). This process continues until all of the fingerprints are traversed to retrieve all of the meta-data for the identified data chunks. Once each recipe is completed, the associated meta-data trace is stored in the data collection storage unit and a check is made to determine whether any further file recipes remain to be traversed to continue the meta-data trace generation process (Block 509). Once all of the file recipes have been traversed, then the meta-data trace generation process is completed and the meta-data traces are available for retrieval for analysis and research related to data storage systems.

Figure 6:
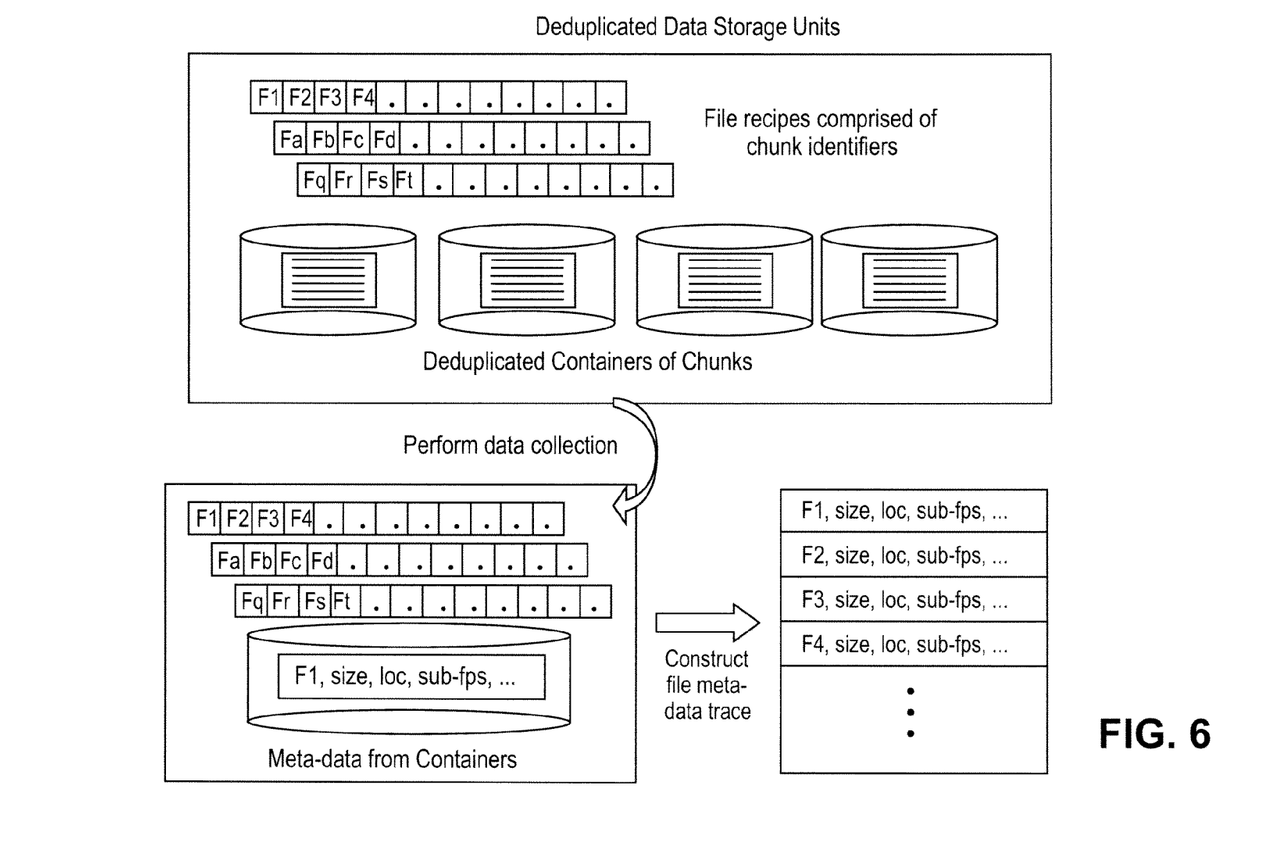
FIG. 6 is a diagram of one embodiment of a meta-data trace generation process.

FIG. 6 is a diagram of one embodiment of a meta-data trace generation process. The diagram illustrates the process described above including the storage of the file recipes in the deduplicated data storage units as well as the storage of the unique data chunks in the data storage units. The data collection process reduces the data set to the file recipes and the meta-data for the unique data chunks, see the example above described in relation to FIG. 3.

The meta-data trace generation process relies on the collected data stored in the data collection storage unit. The meta-data trace generation process then assembles and correlates the file recipes with the meta-data of the data chunks identified by each file recipe to provide greater depth of information for research and analysis. This correlated data is a meta-data trace, which can be stored in the data collection storage unit or provided to an external data analysis or research system. The process of generating the meta-data traces is described with a further more detailed example herein below.

In one embodiment, trace generation can fit within the working memory of the data storage system. In another embodiment, trace generation requires more memory than is available in the working memory; an alternative technique that uses a combination of the working memory and disk storage efficiently to generate traces is described herein below.

Figure 7:
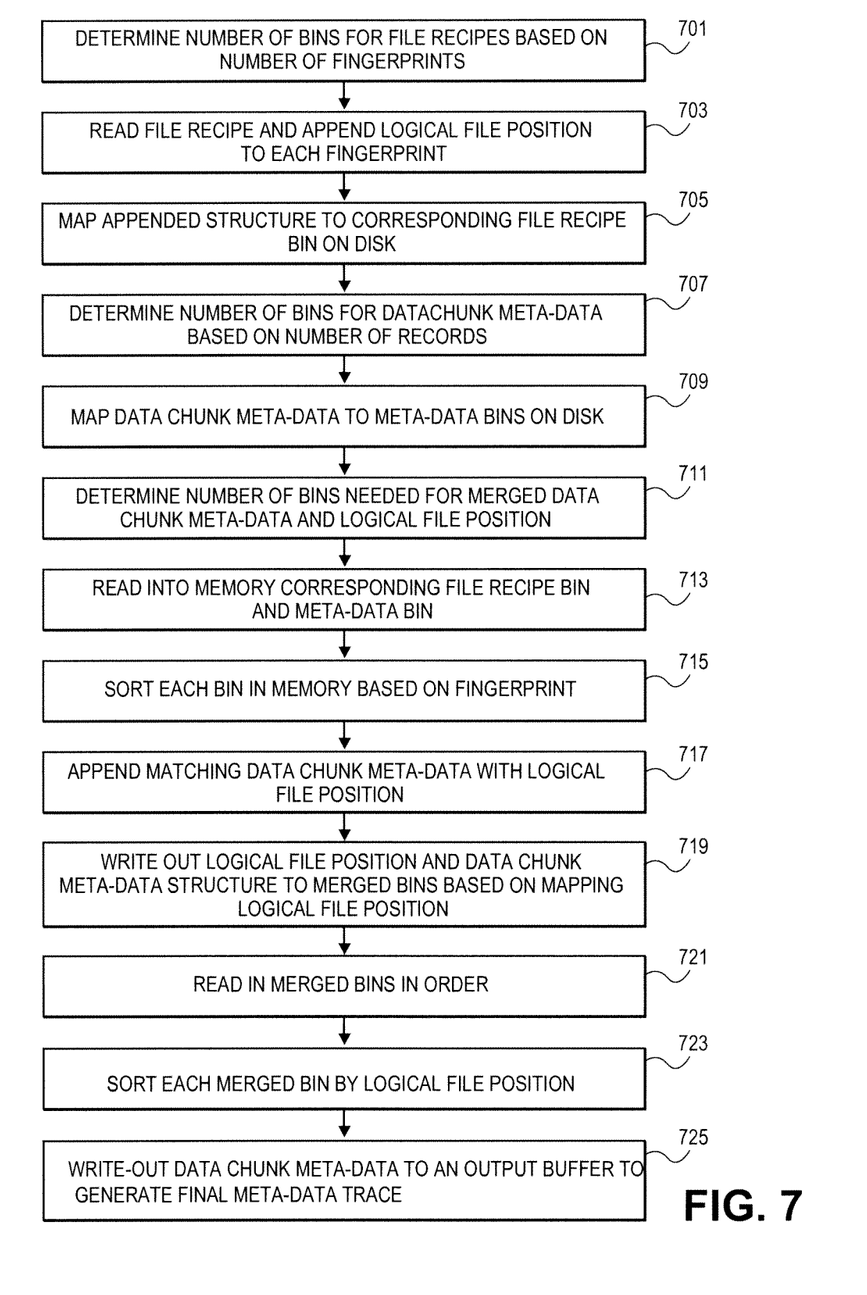
FIG. 7 is a flowchart of another embodiment of a meta-data trace generation process.

FIG. 7 is a flowchart of another embodiment of a meta-data trace generation process. In one embodiment, the process is adapted to efficiently generate meta-data traces using bins that are sized to fit available working memory or similar resource limitations. The bins are storage structures that are designed to fit within working memory such that they can be loaded discretely into the memory to maximize the efficiency of processing the data within each bin. By breaking up the large data sets into bins, the data can be managed with fewer reads and writes to disk, which slows performance due to disparity in disk access times and memory access times.

In one embodiment, the process begins by determining a number of bins needed to store the file recipes to be processed (Block 701). This is determined by querying the number of fingerprints within the file recipes, which indicate the number of associated data chunks and data chunk meta-data to be linked to the file recipe as part of generating the meta-data trace. Each file recipe is read into memory and a logical file position is appended to each fingerprint identified by the file recipe (Block 703). The logical file position is derived from the meta-data of the file recipe or inherent order of the fingerprints in the file recipe. The resulting data structure with the fingerprints of the file recipe and the appended logical file position is mapped to a corresponding file recipe bin on disk (Block 705). This process is illustrated in the upper half of the diagram of FIG. 8.

Figure 8:
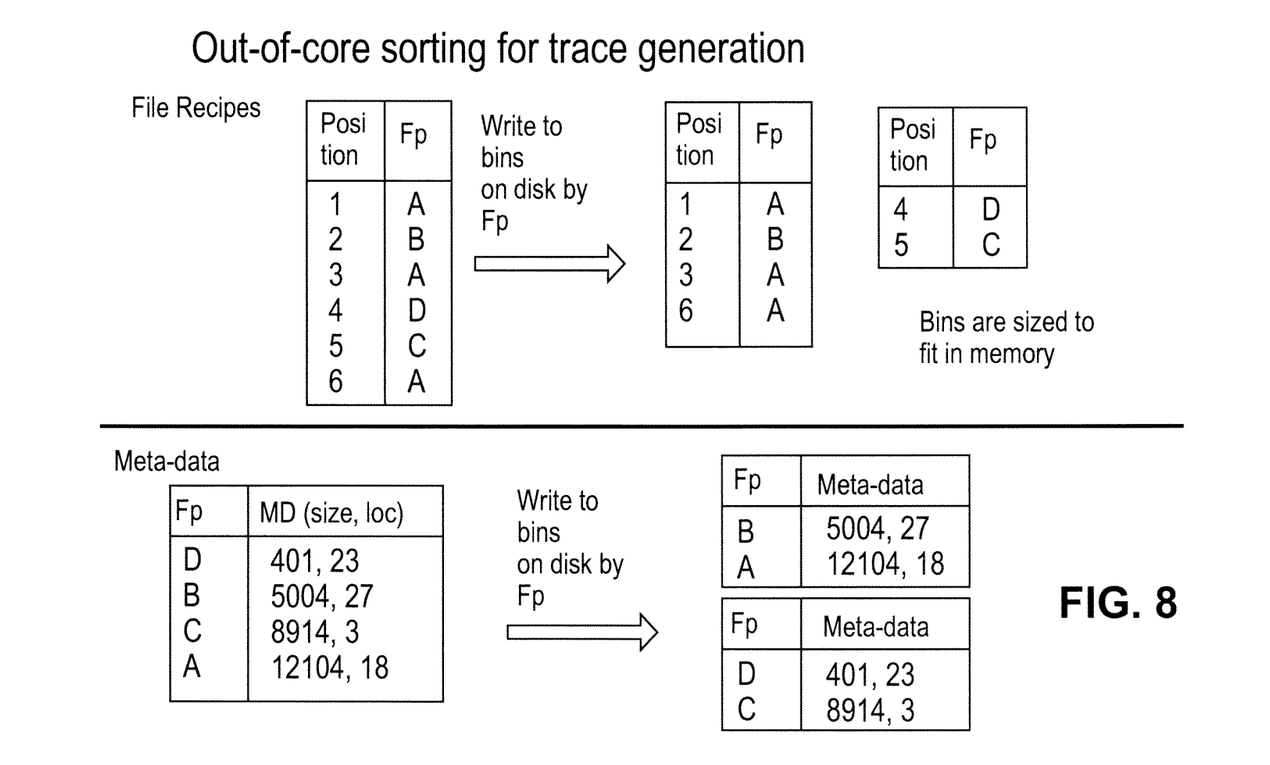
FIG. 8 is a diagram of one embodiment of a first stage of a meta-data trace generation process.

FIG. 8 shows an example file recipe in the upper-left with the constituent fingerprints ordered by their file position. The file recipe is then divided into two bins in this example based on the fingerprints with fingerprints A and B placed in one bin and the second bin holding fingerprints D and C. The values A, B, C and D can be any type of identifier for identifying a unique data chunk. A file recipe, depending on the size of the file can occupy any number of bins and be composed of any number of fingerprints having any number of file positions. The bins are stored in the data storage units and are data structures that are a wrapper for the fingerprints and position information. The bins are sized to fit in the working memory when loaded to maximize the efficiency in working with the data in the bins.

Returning to FIG. 7, the next stage of the process determines a number of bins for data chunk meta-data that are needed (Block 707). The number of bins is determined based on the number of data chunk meta-data records in the data collection storage unit that are to be processed to generate meta-data traces. The meta-data for the unique data chunks are then mapped into the bins on the disk (Block 709). This process is illustrated in the bottom half of the diagram of FIG. 8.

The lower half of FIG. 8 shows the meta-data as it is stored in the data collection storage unit. The meta-data is shown as including a size and location information, however, any type of information about the data chunk can be saved as part of the meta-data. Each entry is identified and matched with its corresponding unique data chunk with a fingerprint (e.g., A-D in this example). The meta-data can have any order or organization. The meta-data is also written to disk in a set of bins based on the fingerprint. In this example, one bin is created for fingerprints A and B while the other bin holds records for fingerprints C and D. The organization of the bins can be designed to match that of the file recipe bins such that corresponding bins can be easily loaded and worked on together.

Returning to FIG. 7, a check is then made to determine a number of bins needed for merged data chunk meta-data and logical file position data (Block 711). A corresponding file recipe bin and meta-data bin are read into memory (Block 713) to start a merger to form the meta-data trace for the file recipe. The file recipe bin and the meta-data bin are then sorted in the memory according to the fingerprint (Block 715). Matching data chunk meta-data is then appended with the logical file position from the correlated file recipe fingerprint (Block 717). This process is illustrated in the diagram of FIG. 9.

Figure 9:
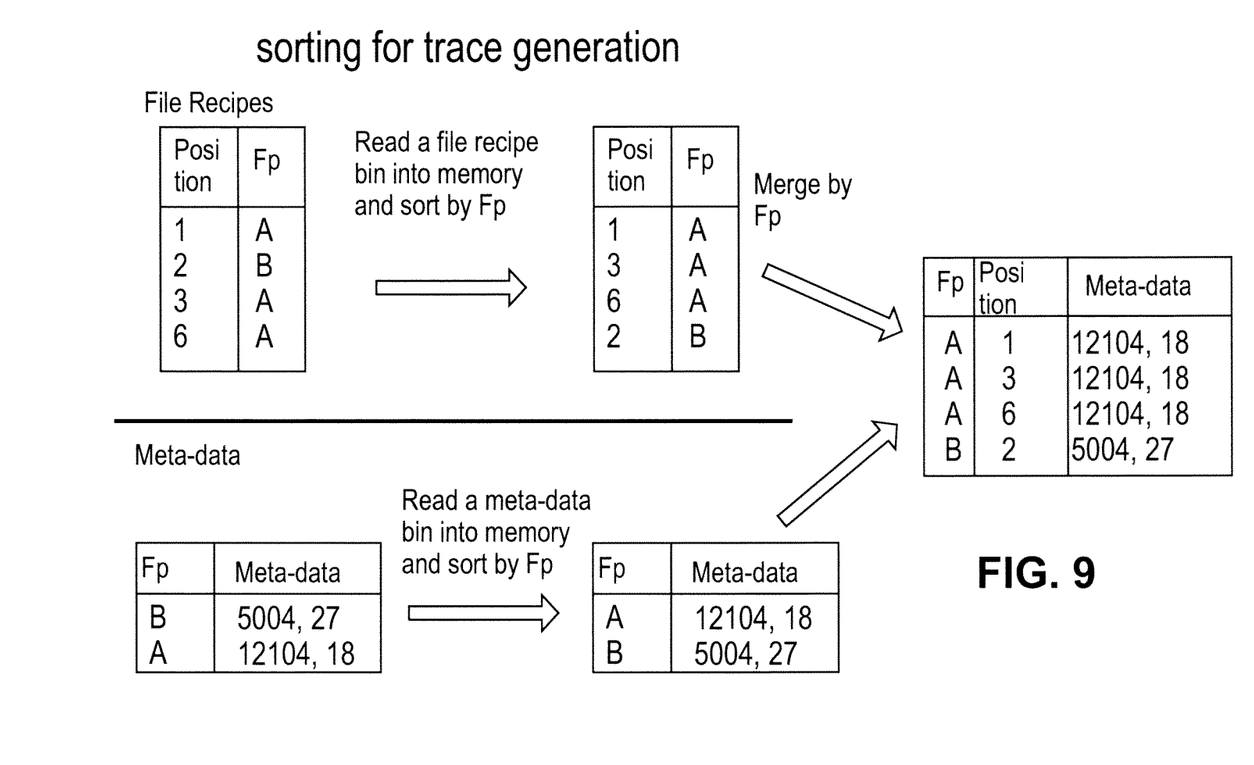
FIG. 9 is a diagram of one embodiment of a second stage of a meta-data trace generation process.

FIG. 9 illustrates how the sorting aligns the data chunks such that the logical file position can be added to the meta-data. Corresponding file recipe and meta-data bins are loaded into the working memory. In the example of FIG. 9, the bins corresponding to fingerprints A and B have been read into memory. The two bins are then merged by mapping the records by the fingerprint and appending the file positions to the meta-data such that each file position for a file recipe forms an entry that includes the corresponding meta-data for the data chunk at the location. The result of the merger is the meta-data trace, which is a data structure that can be stored in the data collection storage unit or that can be provided to external applications or systems for research and analysis.

Figure 10:
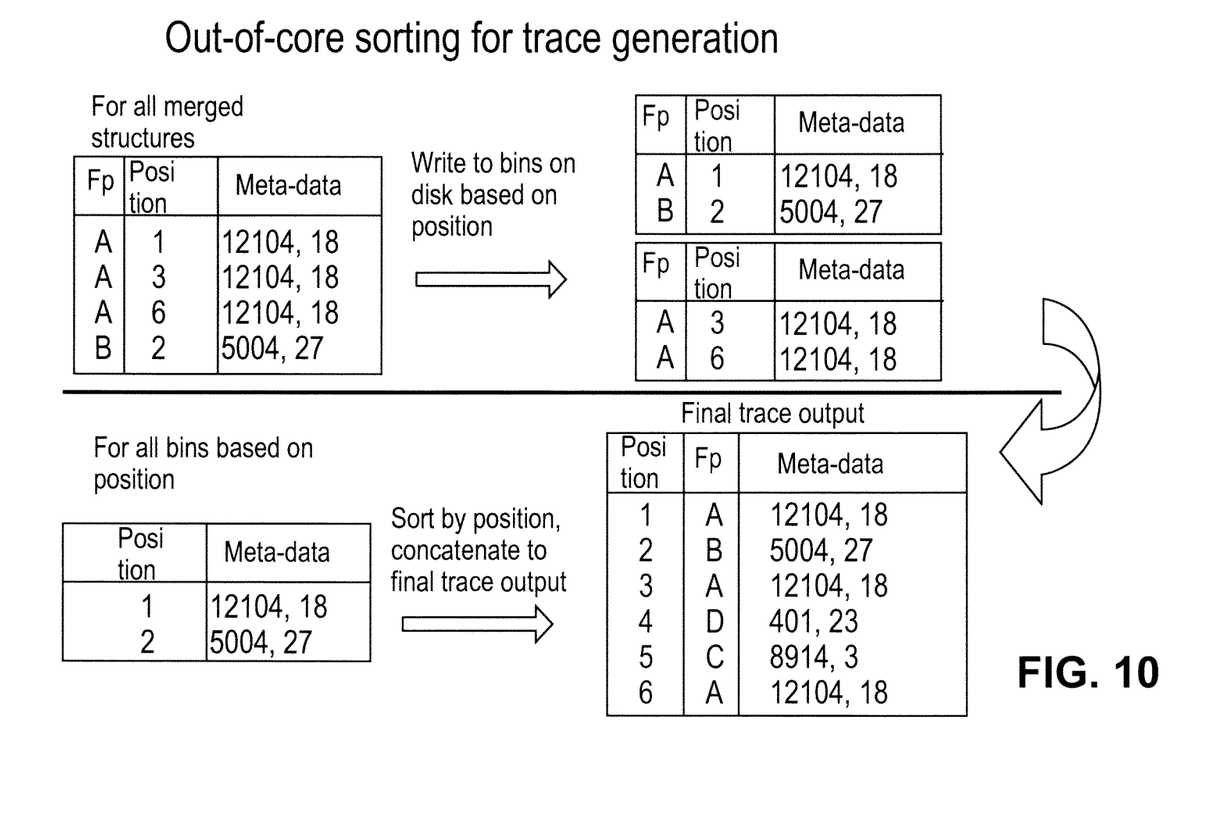
FIG. 10 is a diagram of one embodiment of a third stage of a meta-data trace generation process.

Returning to FIG. 7, the meta-data with appended logical file position data structure, created as described in the preceding paragraph, is then written out to the merged bins based on a mapping related to the logical file position (Block 719). The merged bins created in this manner are then read into memory sequentially (Block 721). The merged bins are then sorted according to their logical file position (Block 723). The resulting data structure is then written out as the data chunk meta-data to an output buffer and merged bins are concatenated to generate a final meta-data trace (Block 725). This process is illustrated in the diagram of FIG. 10, which shows the division of the merged bins written to disk based on the file position and subsequent re-order, which should enable the meta-data trace to be generated.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for collecting meta-data from a deduplication data storage system, the method comprising:
    collecting a set of file recipes for a set of files stored in the deduplication data storage system, each file recipe in the set of file recipes including a fingerprint for each unique data chunk that constitutes a file, wherein each fingerprint identifies each corresponding unique data chunk;
    collecting meta-data for a set of unique data chunks for the collected set of files by a data collection engine, wherein the meta-data describes the unique data chunks;
    anonymizing the collected set of file recipes and the meta-data by an anonymizing engine; and
    storing the anonymized set of file recipes and the anonymized meta-data in a data collection storage unit for content data set analysis without the content data set.

2. The method of claim 1, wherein the meta-data includes any one of data chunk type, local compression size, sub-chunk sizes, fingerprint, data chunk hashes, data chunk resemblance hashes for delta encoding and disk location.

3. The method of claim 1, further comprising:
    dividing each file in the set of files into a set of data chunks and storing corresponding file recipe;
    generating a fingerprint for each data chunk in the set of data chunks; and
    checking each fingerprint against an index to determine unique data chunks to store associated meta-data.

4. The method of claim 1, wherein the collecting the set of file recipes and the collecting the meta-data are part of an on-line process that occurs concurrently with a data storage process for the set of files.

5. The method of claim 1, wherein the collecting the set of file recipes and the collecting the meta-data are part of an off-line process that occurs after the data storage process for the set of files.

6. The method of claim 1, wherein the set of files is greater than five terabytes.

7. A non-transitory computer-readable storage medium having instructions stored therein, which when executed by a computer, cause the computer to perform a method, the method for collecting meta-data from a deduplication data storage system, the method comprising:
    collecting a set of file recipes for a set of files stored in the deduplication data storage system, each file recipe in the set of file recipes including a fingerprint for each unique data chunk that constitutes a file, wherein each fingerprint identifies each corresponding unique data chunk;
    collecting meta-data for a set of unique data chunks for the collected set of files by a data collection engine, wherein the meta-data describes the unique data chunks;
    anonymizing the collected set of file recipes and the meta-data by an anonymizing engine; and
    storing the anonymized set of file recipes and the anonymized meta-data in a data collection storage unit for content data set analysis without the content data set.

8. The non-transitory computer-readable storage medium of claim 7, wherein the meta-data includes any one of data chunk type, local compression size, sub-chunk sizes, fingerprint, data chunk hashes, data chunk resemblance hashes for delta encoding and disk location.

9. The non-transitory computer-readable storage medium of claim 7, further comprising:
    dividing each file in the set of files into a set of data chunks and storing corresponding file recipe;
    generating a fingerprint for each data chunk in the set of data chunks; and
    checking each fingerprint against an index to determine unique data chunks to store associated meta-data.

10. The non-transitory computer-readable storage medium of claim 7, wherein the collecting the set of file recipes and the collecting the meta-data are part of an on-line process that occurs concurrently with a data storage process for the set of files.

11. The non-transitory computer-readable storage medium of claim 7, wherein the collecting the set of file recipes and the collecting the meta-data are part of an off-line process that occurs after the data storage process for the set of files.

12. The non-transitory computer-readable storage medium of claim 7, wherein the set of files is greater than five terabytes.

13. A deduplication storage system, comprising:
    a processing system configuring to execute (1) a data collection engine to collect a set of file recipes for a set of files stored in the deduplication data storage system, each file recipe in the set of file recipes including a fingerprint for each unique data chunk that constitutes a file, wherein each fingerprint identifies each corresponding unique data chunk, the data collection engine to collect meta-data for a set of unique data chunks for the collected set of files, wherein the meta-data describes the unique data chunks and (2) an anonymizing engine that is communicatively coupled to the data collection engine, the anonymizing engine to anonymize the collected set of file recipes and the meta-data; and
    a data collection storage unit communicatively coupled to the processing system and the data collection engine, the data collection storage unit to store the anonymized set of file recipes and the anonymized meta-data for content data set analysis without the content data set.

14. The storage system of claim 13, wherein the meta-data includes any one of data chunk type, local compression size, sub-chunk sizes, fingerprint, data chunk hashes, data chunk resemblance hashes for delta encoding and disk location.

15. The storage system of claim 13, wherein the processing system is further configured to execute:
    a data chunk storage engine that is coupled to the data collection engine, the data chunk storage engine to divide each file in the set of files into a set of data chunks.

16. The storage system of claim 15, wherein the data chunk storage engine generates a fingerprint for each data chunk in the set of data chunks.

17. The storage system of claim 16, wherein the data chunk storage engine checks each fingerprint against an index to determine unique data chunks.

* * * * *